(12) United States Patent
Decker et al.

(10) Patent No.: US 6,536,461 B2
(45) Date of Patent: Mar. 25, 2003

(54) SUBSEA PIG LAUNCHING APPARATUS

(75) Inventors: Robert R. Decker, Magnolia, TX (US); Harold B. Skeels, Kingwood, TX (US); Steven A. Reinhardt, Houston, TX (US)

(73) Assignee: FMC Technologies, Inc., Chicago, IL (US)

(*) Notice: Subject to any disclaimer, the term of this patent is extended or adjusted under 35 U.S.C. 154(b) by 0 days.

(21) Appl. No.: 10/080,109

(22) Filed: Feb. 21, 2002

(65) Prior Publication Data

US 2002/0117208 A1 Aug. 29, 2002

Related U.S. Application Data

(60) Provisional application No. 60/270,801, filed on Feb. 23, 2001.

(51) Int. Cl.$^7$ .................................................. B08B 9/02
(52) U.S. Cl. ............ 137/268; 15/104.062; 15/104.063; 166/70
(58) Field of Search ............... 137/268; 15/104.061, 15/104.062, 104.063; 166/70; 405/170, 158

(56) References Cited

U.S. PATENT DOCUMENTS

| | | | |
|---|---|---|---|
| 3,266,076 A | * | 8/1966 | Surber .................. 18/104.062 |
| 5,219,244 A | | 6/1993 | Skeels |
| 5,842,816 A | | 12/1998 | Cunnigham |
| 6,022,421 A | * | 2/2000 | Bath et al. ............. 15/104.062 |
| 6,336,238 B1 | | 1/2002 | Tarlton |

FOREIGN PATENT DOCUMENTS

| | | |
|---|---|---|
| GB | 2 195 739 A | 4/1988 |
| WO | WO 99/50586 A1 | 10/1999 |

* cited by examiner

*Primary Examiner*—Kevin Lee
(74) *Attorney, Agent, or Firm*—Henry C. Query, Jr.

(57) ABSTRACT

A subsea pig launching apparatus for launching one or more pigs into a flowline which is fluidly connectable to a source of well fluid comprises at least one first hub to which the source of well fluid is connectable and which is in communication with the flowline, a first valve which is positioned between the first hub and the flowline, a second hub which is in communication with the flowline, and a pig launcher which is removably connectable to the second hub and which comprises at least one pig, at least one launch valve which is positioned between a pressure source and the pig, and a launch actuator for selectively opening and closing the launch valve. The launch actuator is controlled by a signal which is communicated through at least one of a number of external control and service lines that are connected to a control and service umbilical for the source of well fluid.

18 Claims, 7 Drawing Sheets

SUBSEA PIG LAUNCHING APPARATUS

The present application is based on U.S. Provisional Patent Application No. 60/270,801, which was filed on Feb. 23, 2001.

BACKGROUND OF THE INVENTION

The present invention relates to an apparatus for launching one or more pigs into a subsea flowline or the like. More particularly, the invention relates to such an apparatus which utilizes the well fluid from a subsea christmas tree or the like, or the fluid from an external control and service line that is connected to the christmas tree, to launch the pigs from the device into the flowline.

In the field of subsea oil and gas production, pigs are used to, among other things, clean and inspect the flowline which connects one or more subsea christmas trees, manifolds or similar such sources of well fluid to a distant product receiving or production facility. The pigs are conveyed, or launched, into the flowline by a pig launcher, which typically comprises a cartridge for housing a number of pigs, a launch barrel for connecting the cartridge to the flowline, a source of fluid pressure for pushing the pigs from the cartridge into the flowline, and a number of launch valves to control the flow of fluid pressure from the fluid pressure source to the cartridge. Once the pig or pigs are launched into the flowline, they are conveyed to the product receiving or production facility by the flow of the well fluid from the subsea well.

Prior art pig launchers may be located at either the product receiving or production facility or adjacent the subsea well. When the pig launcher is located at the product receiving or production facility, a conduit must usually be provided between the that facility and the subsea well in order to convey the pigs from the pig launcher to the beginning of the flowline. When the pig launcher is located adjacent the subsea well, the fluid pressure source is typically still located at the product receiving or production facility, and a fluid pressure line must therefore be provided between that facility and the pig launcher. In addition, one or more control lines must also be provided between the product receiving or production facility and the pig launcher in order to convey control fluid to the launch valves. In either case, such conduits and lines extending from the facility to the subsea well or the pig launcher necessarily increase the cost and complexity of the subsea production system.

SUMMARY OF THE INVENTION

In accordance with the present invention, these and other limitations in the prior art are overcome by providing an apparatus for launching one or more pigs into a flowline which is fluidly connectable to a source of well fluid. The apparatus comprises at least one first hub to which the source of well fluid is connectable and which is in communication with the flowline, a first valve which is positioned between the first hub and the flowline, a second hub which is in communication with the flowline, and a pig launcher which is removably connectable to the second hub. The pig launcher includes at least one pig, at least one launch valve which is positioned between a pressure source and the pig, and a launch actuator for selectively opening and closing the launch valve. Furthermore, the launch actuator is controlled by a signal which is communicated through at least one of a number of external control and service lines that are connected to a control and service umbilical for the source of well fluid. In this manner, the control of the launch procedure is provided through the external control and service lines. Consequently, a separate controls umbilical from a production facility or the like is not required for the communication of control signals to the apparatus.

In accordance with one embodiment of the invention, the apparatus further comprises a fluid conduit which connects the first hub with the launch valve, and the pressure source comprises well fluid from the source of well fluid. Thus, a separate conduit from a production facility or the like is not required for the supply of pressurized fluid to the pig launcher.

In accordance with another embodiment of the invention, the apparatus further comprises means for fluidly connecting at least one of the external control and service lines with the launch valve, and the pressure source comprises fluid from the external control and service line. Consequently, neither well fluid nor a separate conduit from a production facility or the like are required for the supply of pressurized fluid to the pig launcher.

In one embodiment of the invention, the connecting means comprises a fluid connector which is mounted on the pig launcher and which is in fluid communication with the launch valve. In this manner, the external control and service lines may be connected directly to the pig launcher.

In another embodiment of the invention, the connecting means comprises a first fluid connector which is connectable to the external control and service line and which is fixed in position relative to the first and second hubs, a second fluid connector which is fixed in position relative to the first and second hubs, a number of control and service conduits which are connected between the first and second fluid connectors, and means for establishing fluid communication between the second fluid connector and the launch valve. The fluid communication means may include, for example, a third fluid connector which is fixed in position relative to the pig launcher and which is fluidly connected to the launch valve, and a fluid conduit which is connectable between the second and third fluid connectors. In this manner, the external control and service lines may first be connected to a support structure on which the first and second hubs are mounted, and then connected to the pig launcher via the second and third fluid connectors.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

Figure 1:
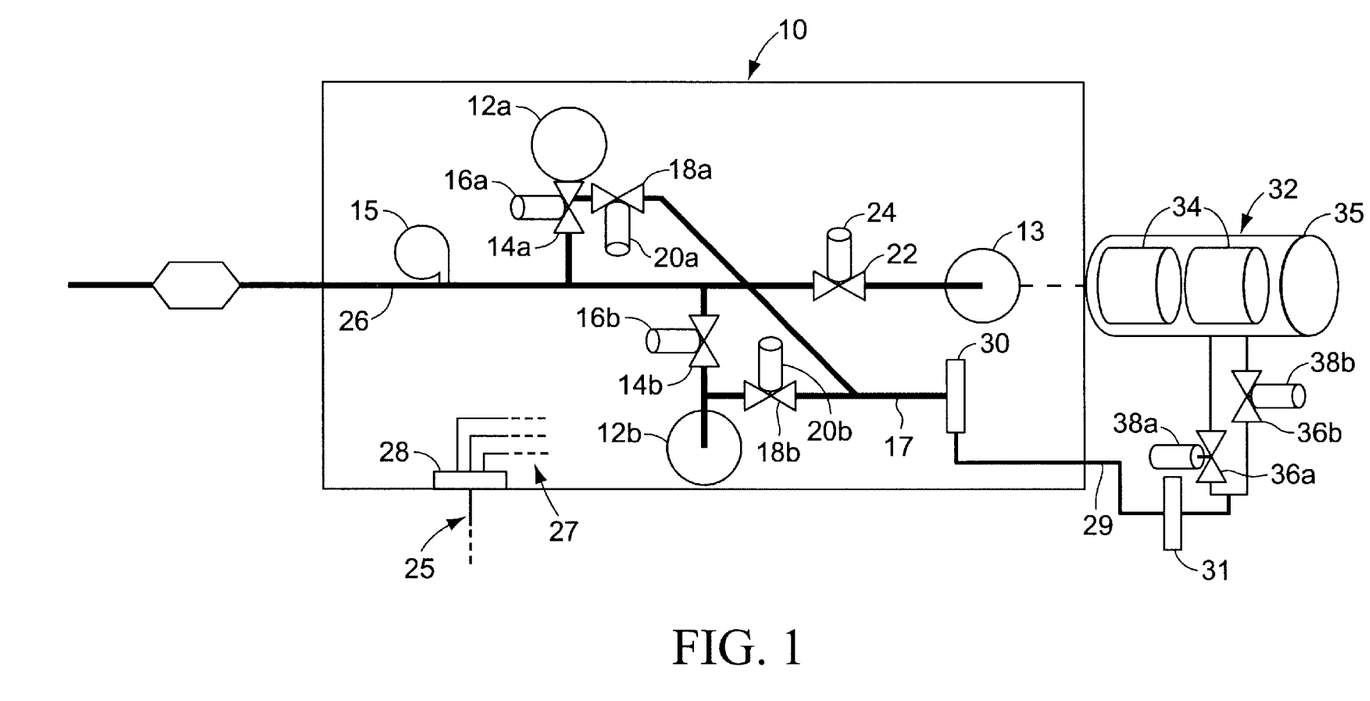
FIG. 1 is a schematic diagram of one embodiment of the pig launching apparatus of the present invention.

Referring to FIG. 1, the subsea pig launching apparatus of the present invention is shown to comprise a support structure in the form of a sled 10 which includes a number of production hubs 12a, 12b that are each fluidly connectable to a production outlet of a corresponding christmas tree or other such source of well fluid (not shown) in a manner well understood by those of ordinary skill in the art. The production hubs 12a, 12b are in communication with a flowline 26 that extends, for example, to a distant product receiving or production facility. An isolation valve 14a, 14b is positioned between each production hub 12a, 12b and the flowline 26 to control the flow of fluid therebetween. Furthermore, each isolation valve 14a, 14b may be remotely and selectively opened and closed via a respective actuator 16a, 16b. Thus, in the arrangement shown in FIG. 1, the well fluid from each christmas tree is communicated to the flowline 26 through a corresponding production hub 12a, 12b.

The sled 10 also comprises a kicker line 17 which fluidly connects each hub 12a, 12b to a conventional multi-quick connector ("MQC") 30 that is mounted on the sled 10. A kicker valve 18a, 18b is preferably disposed between each hub 12a, 12b and the kicker line 17 to control the flow of fluid therebetween. The kicker valves 18a, 18b may be remotely and selectively opened and closed via respective actuators 20a, 20b.

The sled 10 further comprises a multipurpose hub 13 which is in communication with the flowline 26, and an isolation valve 22 which is positioned between the multipurpose hub and the flowline. An actuator 24 may be provided to remotely and selectively open and close the isolation valve 22.

In the embodiment of the invention depicted in FIG. 1, a number of external control and service lines 25 are releasably coupled to a conventional MQC 28 which is mounted on the sled 10. These control and service lines 25 are preferably routed from one of the subsea christmas trees, where they are connected by suitable means to a conventional control and service umbilical that extends, for example, to the production facility and is provided for the operation and maintenance of the christmas tree. Alternatively, the control and service lines 25 could be routed from any other component which is tied to the umbilical, such as an umbilical termination head or a hydraulic distribution module.

Several of the external control and service lines 25 which are connected to the MQC 28 are ideally provided for the remote control of the valve actuators 16a, 16b, 20a, 20b and 24. From the MQC 28, the control signals from these control and service lines 25 are conveyed to the individual actuators by corresponding control and service conduits 27 which are mounted on the sled 10. In addition, for reasons which will be discussed below, a number of the external control and service lines 25 which are connected to the MQC 28 are communicated via corresponding control and service conduits 27 to the MQC 30. Each control and service line 25 may convey hydraulic fluid, methanol, glycol or any other control or well service fluid, as may be appropriate for the particular purpose which is served by such control and service line. For example, hydraulic fluid is ideally employed in the control and service lines for the actuators 16a, 16b, 20a, 20b and 24.

In accordance with the present invention, the pig launching apparatus also comprises a pig launcher 32 for selectively launching one or more pigs 34 into the flowline 26. The pig launcher 32 is optimally removably connectable to the multipurpose hub 13 and includes a conventional cartridge 35 which houses the pigs 34 and a number of launch valves 36a, 36b which are positioned between the cartridge and a source of fluid pressure. In this embodiment of the invention, the launch valves 36a, 36b are in fluid communication with the kicker line 17 on the sled 10 via an MQC 31, which is releasably coupled to the MQC 30 via a service flow loop ("SFL") 29. In addition, the launch valves 36a, 36b may be remotely and selectively opened and closed via respective actuators 38a, 38b. A number of the external control and service lines which are connected to the MQC 28 on the sled 10 are in communication with the pig launcher 32 via corresponding control and service conduits that are connected between the MQC's 30 and 31 and are secured to or incorporated into the SFL 29. Moreover, control of the actuators 38a, 38b is preferably provided by corresponding control and service conduits on the pig launcher 32 which are connected to the MQC 31.

In operation of this embodiment of the subsea pig launching apparatus, when it is desired to launch a pig 34 into the flowline 26, the actuators 16a, 16b are activated to close the isolation valves 14a, 14b and thereby isolate the production hubs 12a, 12b from the flowline. Next, the actuators 20a, 20b are activated to open the kicker valves 18a, 18b and thus divert the well fluid from the production hubs 12a, 12b to the launch valves 36a, 36b through the kicker line 17, the MQC 30, the SFL 29 and the MQC 31. The actuator 24 is then activated to open the valve 22, and the actuators 38a, 38b are thereafter activated to open the launch valves 36a, 36b in the proper sequence required to launch a pig 34 through the hub 13 and into the flowline 26. Thus, the pig launcher employs the well fluid from the subsea christmas trees as the boost fluid to push the pig 34 into the flowline 26. Once the pig 34 is downstream of hubs 12a, 12b, it is detected by pig detector 15 which generates a signal to trigger a control sequence to close the valves 18a, 18b, 36a, 36b, and 22 and open the valves 14a, 14b. The pig 34 is then pushed through the flowline 26 by the well fluid flowing through the hubs 12a, 12b until it is retrieved at a predetermined point downstream.

Figure 2:
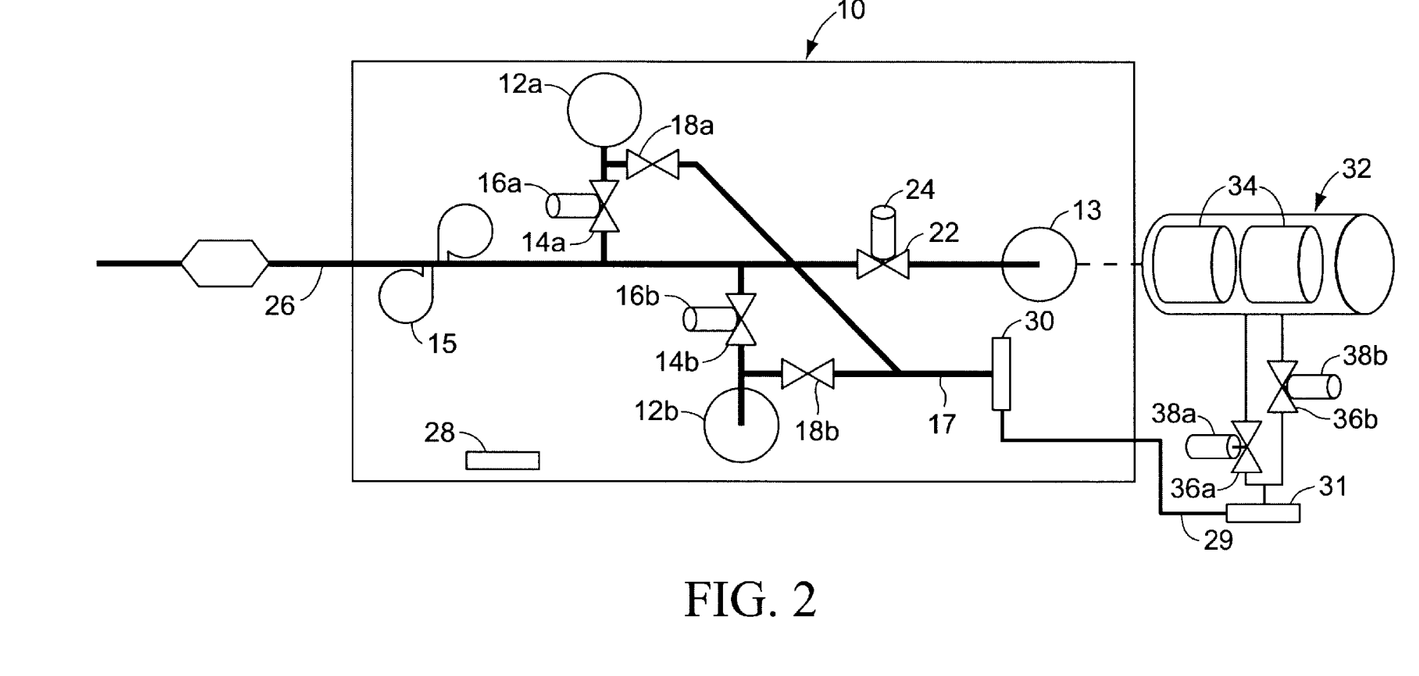
FIGS. 2 through 7 are schematic diagrams of various alternative embodiments of the pig launching apparatus of the present invention.

Referring to FIG. 2, an embodiment of a subsea pig launching apparatus is shown which is very similar to that depicted in FIG. 1. In this embodiment, however, actuators are not provided for the kicker valves 18a, 18b. Consequently, the cost and complexity of the sled 10 are significantly reduced. Of course, this requires that the kicker valves be actuated by an ROV or a diver, but this is not necessarily disadvantageous. For one, the pig launcher 32 already includes the launch valves 36a, 36b for controlling the flow of boost fluid from the kicker line 17, and these valves are provided with actuators 38a, 38b. Also, the kicker valves 18a, 18b need only be actuated during installation or removal of the pig launcher 32, and at these times an ROV or a diver is already present and can therefore be used to actuate the kicker valves. Moreover, in the event of a failure of one of the actuators 38a, 38b, the entire pig launcher 32 can be easily retrieved to the surface for repairs.

Figure 3:
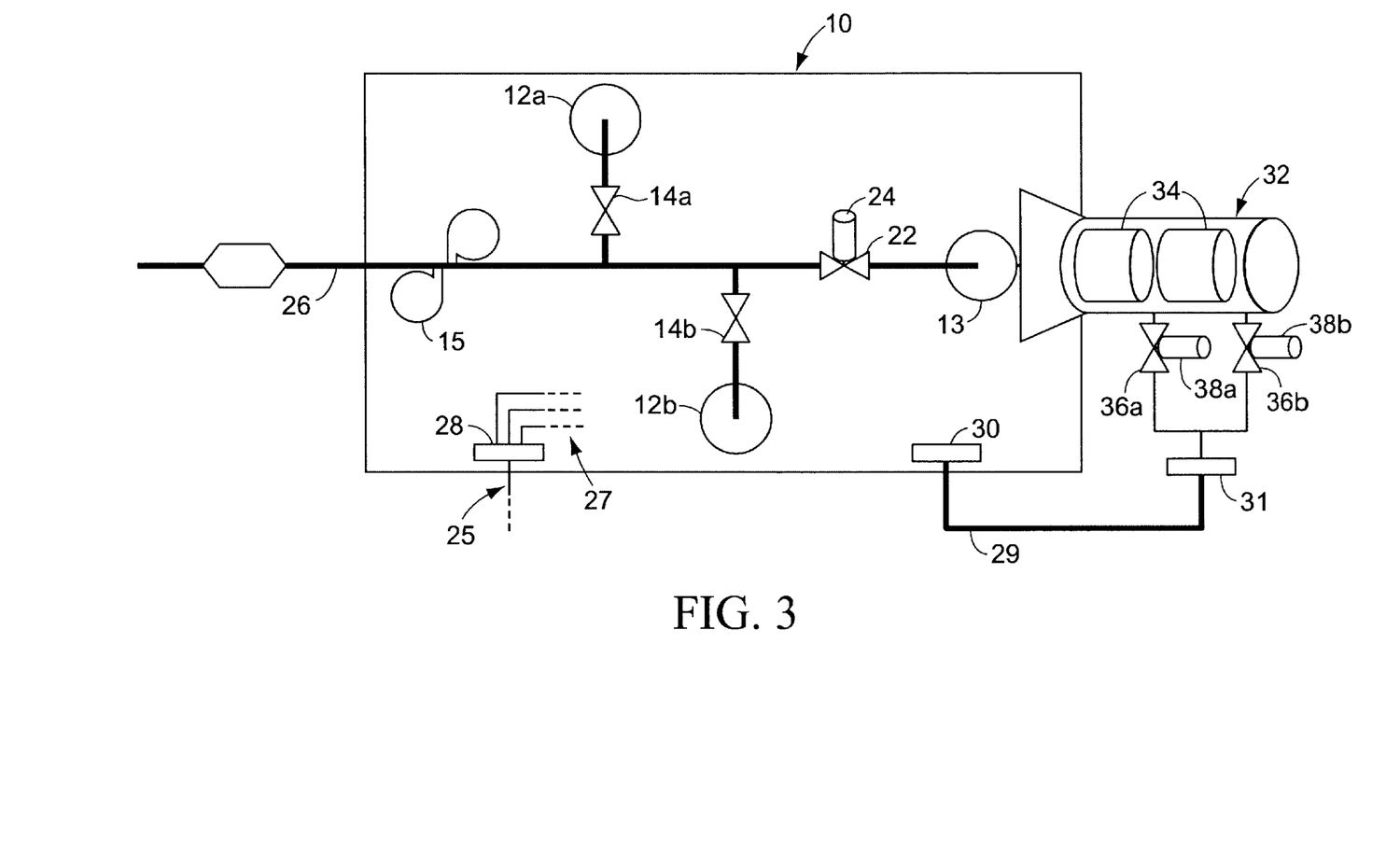

Referring now to FIG. 3, another embodiment of a subsea pig launching apparatus according to the present invention is shown to comprise a sled 10 which includes one or more production hubs 12a, 12b, a multipurpose hub 13 and flowline 26, all of which are connected in a manner similar to that shown in FIG. 1. Also, similar to the FIG. 1 embodiment, the subsea pig launching apparatus of this embodiment includes a pig launcher 32, an SFL which connects an MQC 30 on the sled 10 with an MQC 31 on the pig launcher, an MQC 28 on the sled which is connected to a number of external control and service lines 25, and a plurality of control and service conduits 27 which connect the MQC 28 with the MQC 30. In this embodiment, however, the pig launcher 32 uses a control or service fluid from one or more of the external control and service lines 25 as the boost fluid for pushing the pigs 34 into the flowline 26. The control or service boost fluid is communicated from the external control and service lines 25 to the launch valves 36a, 36b via the MQC 28, the control and service conduits 27, the MQC 30, the SFL 29 and the MQC 31 on the pig launcher.

When it is desired to launch a pig 34 into the flowline 26, the tree or other source of well fluid is shut-in, and the actuator 24 is activated to open the valve 22. The actuators 38a, 38b are then activated to actuate the launch valves 36a, 36b in the proper sequence required to launch a pig 34 into the flowline 26. Once the pig 34 is downstream of the production hubs 12a, 12b, it is detected by a pig detector 15. A signal from the pig detector 15 triggers a control sequence which closes the valve 22, 36a, 36b. The valves on the tree or other source of well fluid are then reopened, allowing production flow to the sled 10 to resume. The pig 34 is then pushed through the flowline 26 by the well fluid from production hubs 12a, 12b until it is retrieved at a predetermined point downstream.

Using the fluid from an external control and service line as the boost fluid allows for significant simplification of the subsea pig launching apparatus of this embodiment. Since the well fluid from the production hubs 12a, 12b is not used as the boost fluid, it is no longer necessary to route well fluid to the pig launcher, and the kicker lines, kicker valves and actuators can therefore be eliminated from the sled 10. In addition, since the well fluid does not need to be diverted to the pig launcher, the isolation valves 14a, 14b no longer need to be closed during pig launching. Consequently, the actuators for the isolation valves 14a, 14b may be eliminated. Thus, by using the fluid from an external control and service line as the boost fluid for launching the pigs, two valves, four valve actuators, and the kicker line piping can all be eliminated from the sled 10. This results in a dramatic decrease in the cost and complexity of the sled, as well as a significant improvement in system reliability.

Figure 4:
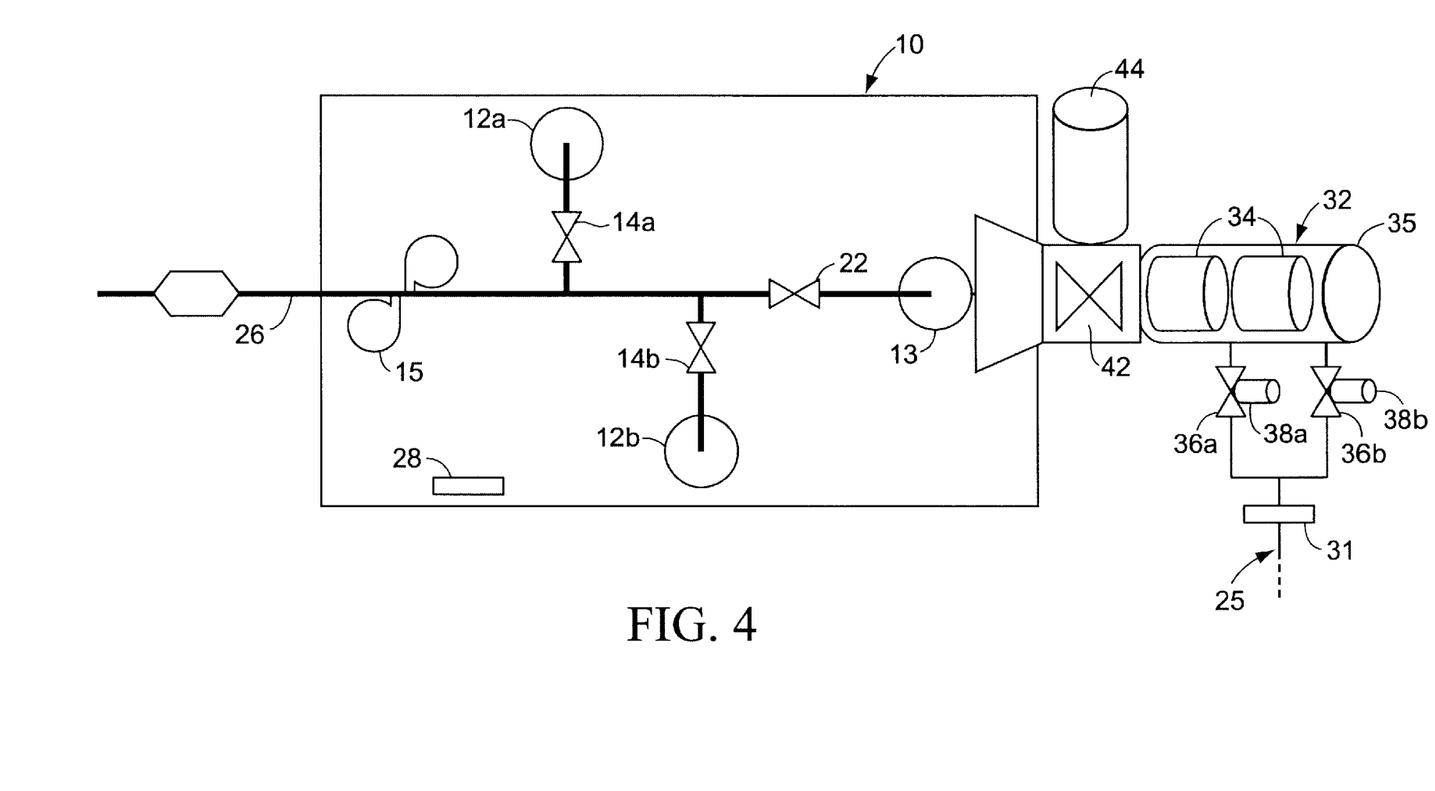

Another embodiment of the subsea pig launching apparatus of the present invention is shown in FIG. 4. This embodiment is similar to that shown in FIG. 3. However, the sled 10 of this embodiment does not include an actuator for the isolation valve 22. instead, the pig launcher 32 comprises a launcher isolation valve 42 which is positioned on the pig launcher between the cartridge 35 and the hub 13. In addition, the isolation valve 42 may be remotely and selectively opened via an actuator 44. Since actuators are located on the sled 10, no need exists to connect the external control and service lines 25 to the sled. Therefore, the external control and service lines 25 are preferably releasably connected directly to the MQC 31 on the pig launcher 32. When it is desired to launch a pig 34 into the flowline 26, the valve 42 is opened by sending an appropriate signal to the actuator 44. The remainder of the pig launching operation is essentially as described above in connection with the FIG. 3 embodiment.

Figure 5:
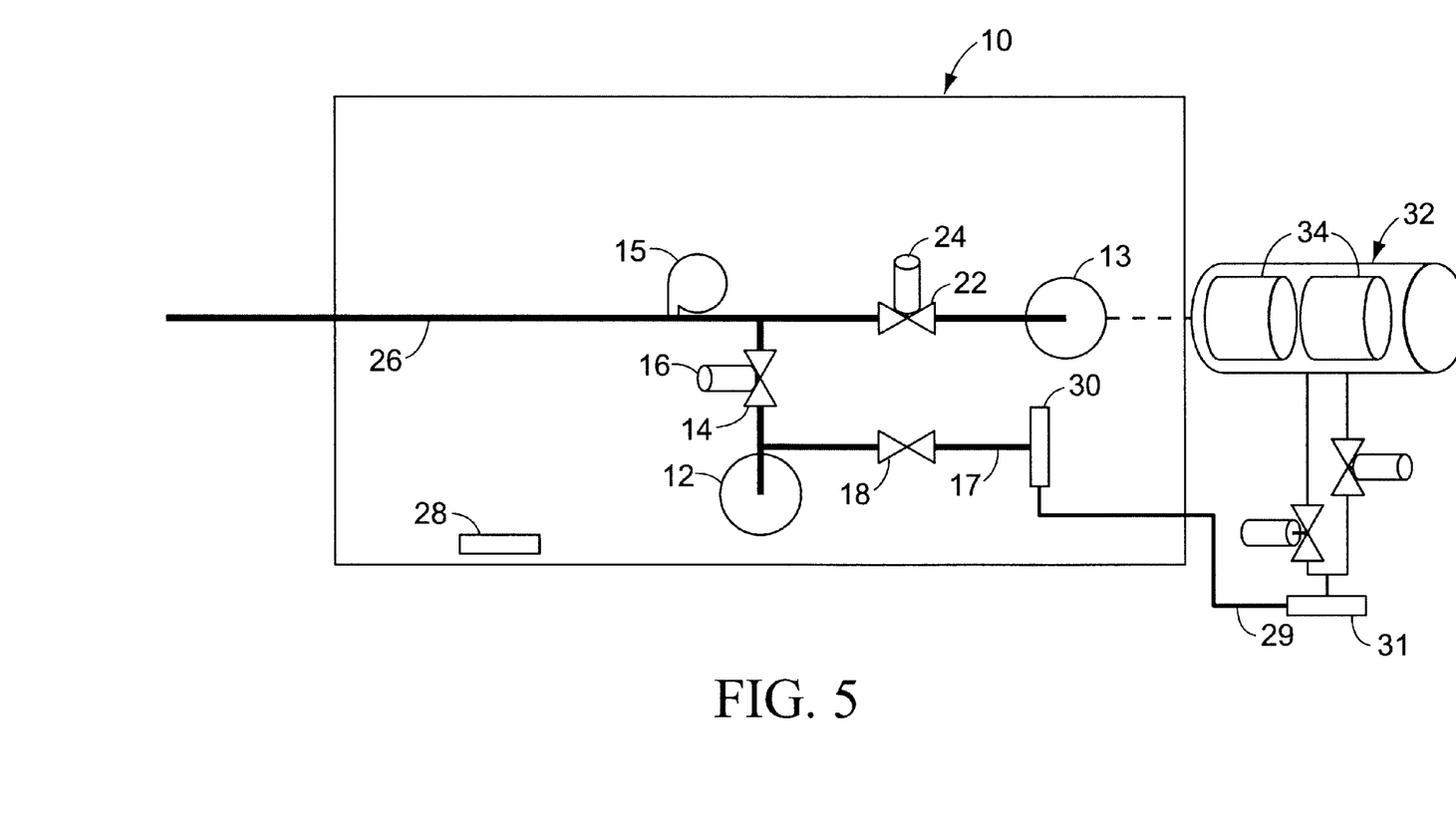

FIG. 5 shows an embodiment of a subsea pig launching apparatus which is similar to that of FIG. 2, except that the sled 10 of this embodiment includes only a single production hub 12. The production hub 12 is selectively connected to the flowline 26 through an isolation valve 14, which may be remotely and selectively opened and closed via an actuator 16. The procedure for launching a pig 34 in this embodiment of the invention is essentially the same as that for the embodiment of FIG. 2, except that the boost fluid is communicated from only a single production hub, i.e., production hub 12.

Figure 6:
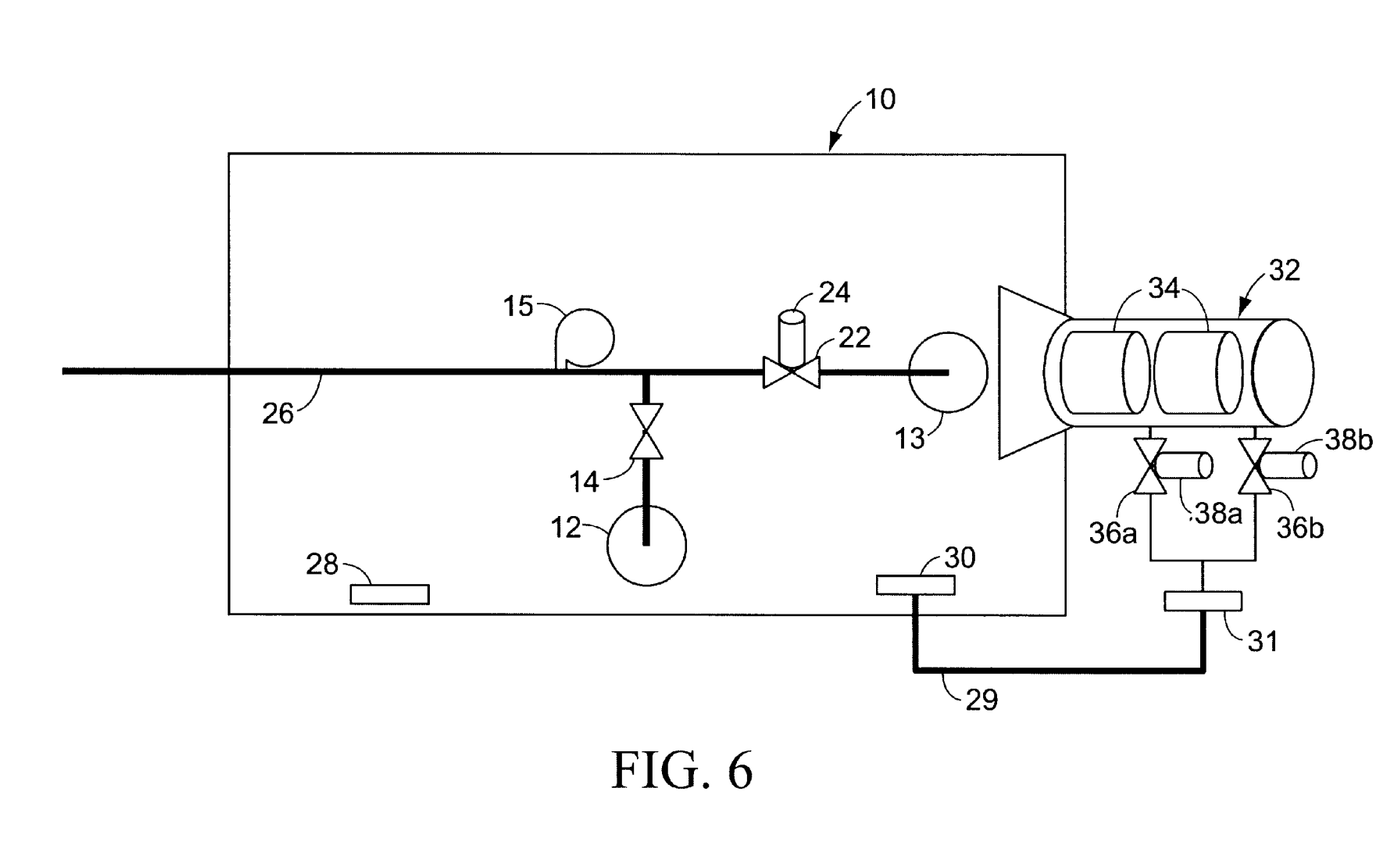

FIG. 6 shows an embodiment of a subsea pig launching apparatus which is similar to that of FIG. 3, except that sled 10 of this embodiment includes only a single production hub 12, which is selectively connected to the flowline 26 through an isolation valve 14. The procedure for launching a pig 34 in this embodiment of the invention is essentially the same as that for the embodiment of FIG. 3.

Figure 7:
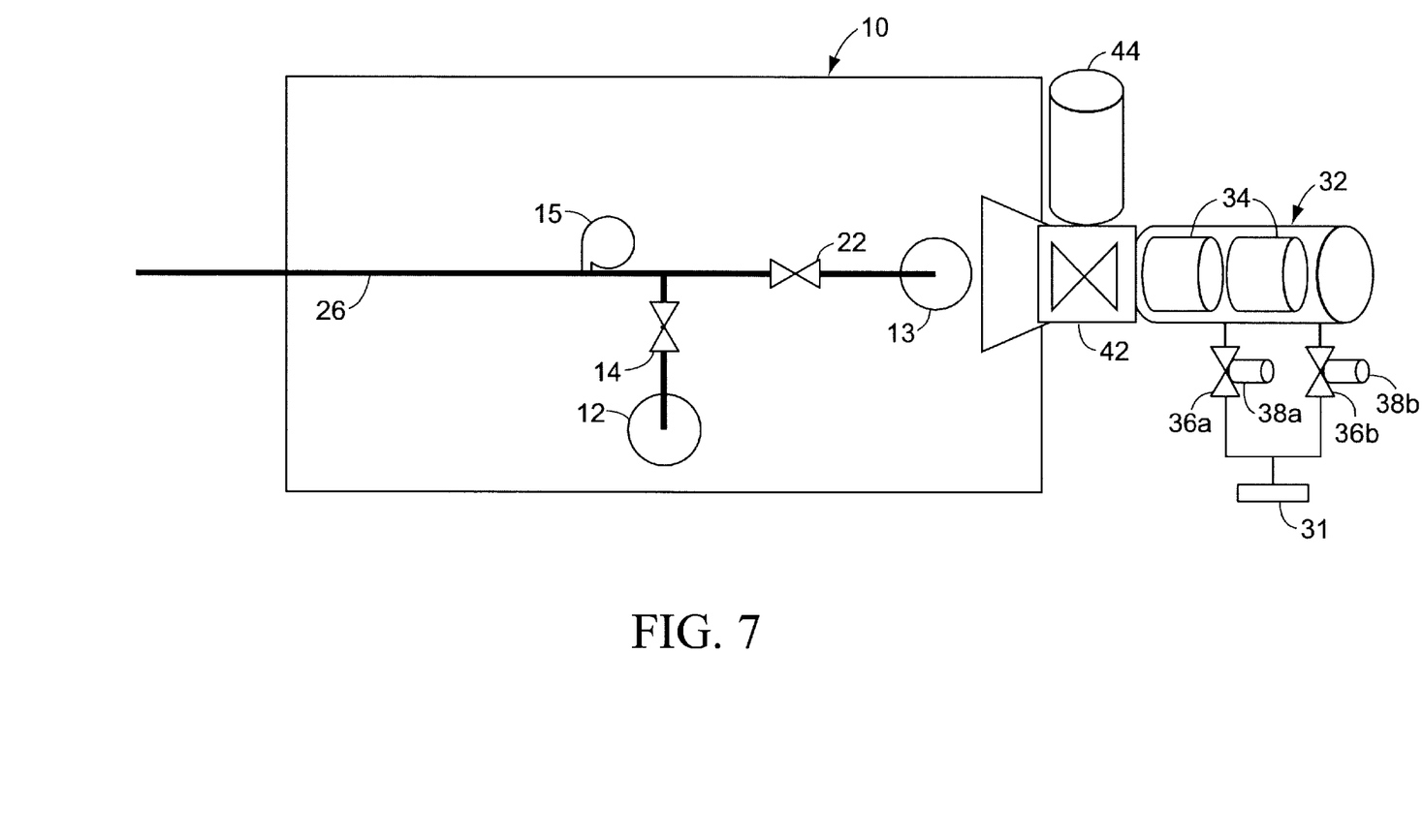

FIG. 7 shows an embodiment of a subsea pig launching apparatus of the present invention which is similar to that of FIG. 4, except that the sled 10 of this embodiment includes only a single production hub 12, which is selectively connected to the flowline 26 through an isolation valve 14. The procedure for launching a pig 34 using this embodiment of the invention is essentially the same as that for the embodiment of FIG. 4.

It should be recognized that, while the present invention has been described in relation to the preferred embodiments thereof, those skilled in the art may develop a wide variation of structural and operational details without departing from the principles of the invention. For example, different features of the various embodiments may be combined in a manner not described herein. Therefore, the appended claims are to be construed to cover all equivalents falling within the true scope and spirit of the invention.

What is claimed is:

1. An apparatus for launching one or more pigs into a flowline which is fluidly connectable to a source of well fluid, the apparatus comprising:
   at least one first hub to which the source of well fluid is connectable and which is in communication with the flowline;
   a first valve which is positioned between the first hub and the flowline;
   a second hub which is in communication with the flowline;
   a pig launcher which is removably connectable to the second hub and which comprises:
      at least one pig;
      at least one launch valve which is positioned between a pressure source and the pig; and
      a launch actuator for selectively opening and closing the launch valve;
      wherein the launch actuator is controlled by a signal which is communicated through at least one of a number of external control and service lines that are connected to a control and service umbilical for the source of well fluid.

2. The apparatus of claim 1, further comprising:
   a fluid conduit which connects the first hub with the launch valve;
   wherein the pressure source comprises well fluid from the source of well fluid.

3. The apparatus of claim 2, further comprising a kicker valve which is positioned in the fluid conduit.

4. The apparatus of claim 3, further comprising:
   a kicker actuator for selectively opening and closing the kicker valve;
   wherein the kicker actuator is controlled by a signal which is communicated through at least one of the external control and service lines.

5. The apparatus of claim 1, further comprising:
   a first actuator for selectively opening and closing the first valve;
   wherein the first actuator is controlled by a signal which is communicated through at least one of the external control and service lines.

6. The apparatus of claim 5, further comprising a second valve which is positioned between the second hub and the flowline.

7. The apparatus of claim 6, further comprising:
a second actuator for selectively opening and closing the second valve;
wherein the second actuator is controlled by a signal which is communicated through at least one of the external control and service lines.

8. The apparatus of claim 7, further comprising:
a fluid conduit which connects the first hub with the launch valve; and
a kicker valve which is positioned in the fluid conduit;
wherein the pressure source comprises well fluid from the source of well fluid.

9. The apparatus of claim 8, further comprising:
a kicker actuator for selectively opening and closing the kicker valve;
wherein the kicker actuator is controlled by a signal which is communicated through at least one of the external control and service lines.

10. The apparatus of claim 1, further comprising:
means for fluidly connecting at least one of the external control and service lines with the launch valve;
wherein the pressure source comprises fluid from the external control and service line.

11. The apparatus of claim 10, wherein the connecting means comprises a fluid connector which is mounted on the pig launcher and which is in fluid communication with the launch valve.

12. The apparatus of claim 11, wherein the fluid connector comprises an MQC.

13. The apparatus of claim 10, wherein the connecting means comprises:
a first fluid connector which is connectable to the external control and service line and which is fixed in position relative to the first and second hubs;
a second fluid connector which is fixed in position relative to the first and second hubs;
a number of control and service conduits which are connected between the first and second fluid connectors; and
means for establishing fluid communication between the second fluid connector and the launch valve.

14. The apparatus of claim 13, wherein the fluid communication means comprises:
a third fluid connector which is fixed in position relative to the pig launcher and which is fluidly connected to the launch valve; and
a fluid conduit which is connectable between the second and third fluid connectors.

15. The apparatus of claim 13, wherein the first, second and third fluid connectors each comprise an MQC.

16. The apparatus of claim 1, further comprising:
a support structure on which the first and second hubs are mounted;
first means for coupling the external control and service lines to the support structure;
a number of control and service conduits which are mounted on the support structure and which are connected to the first coupling means;
a first conduit which is in communication with the launch actuator; and
second means for coupling the first conduit to the control and service conduits;
wherein the first and second coupling means are mounted on the support structure; and
wherein the signal for the launch actuator is communicated from the external control and service conduit through the first and second coupling means and the first conduit.

17. The apparatus of claim 16, further comprising:
a second conduit which is connected between the first hub and the second coupling means;
a third conduit which is in communication with the launch valve and which is connected to the second conduit through the second coupling means;
wherein the pressure source comprises well fluid from the source of well fluid.

18. The apparatus of claim 16, further comprising:
a second conduit which is in communication with the launch valve and which is connected to the control and service conduits through the second coupling means;
wherein the pressure source comprises fluid from one of the external control and service lines.

* * * * *